June 10, 1947.  C. DORNIER ET AL  2,421,870
AIR BRAKE FOR AIRCRAFT
Filed Jan. 23, 1939  6 Sheets-Sheet 1

INVENTORS.
CLAUDE DORNIER.
FRANZ STAUFER.
FRANZ BOTTLING.
HUBERT WÄHNER.
BY Karl B. Meyr
ATTORNEY.

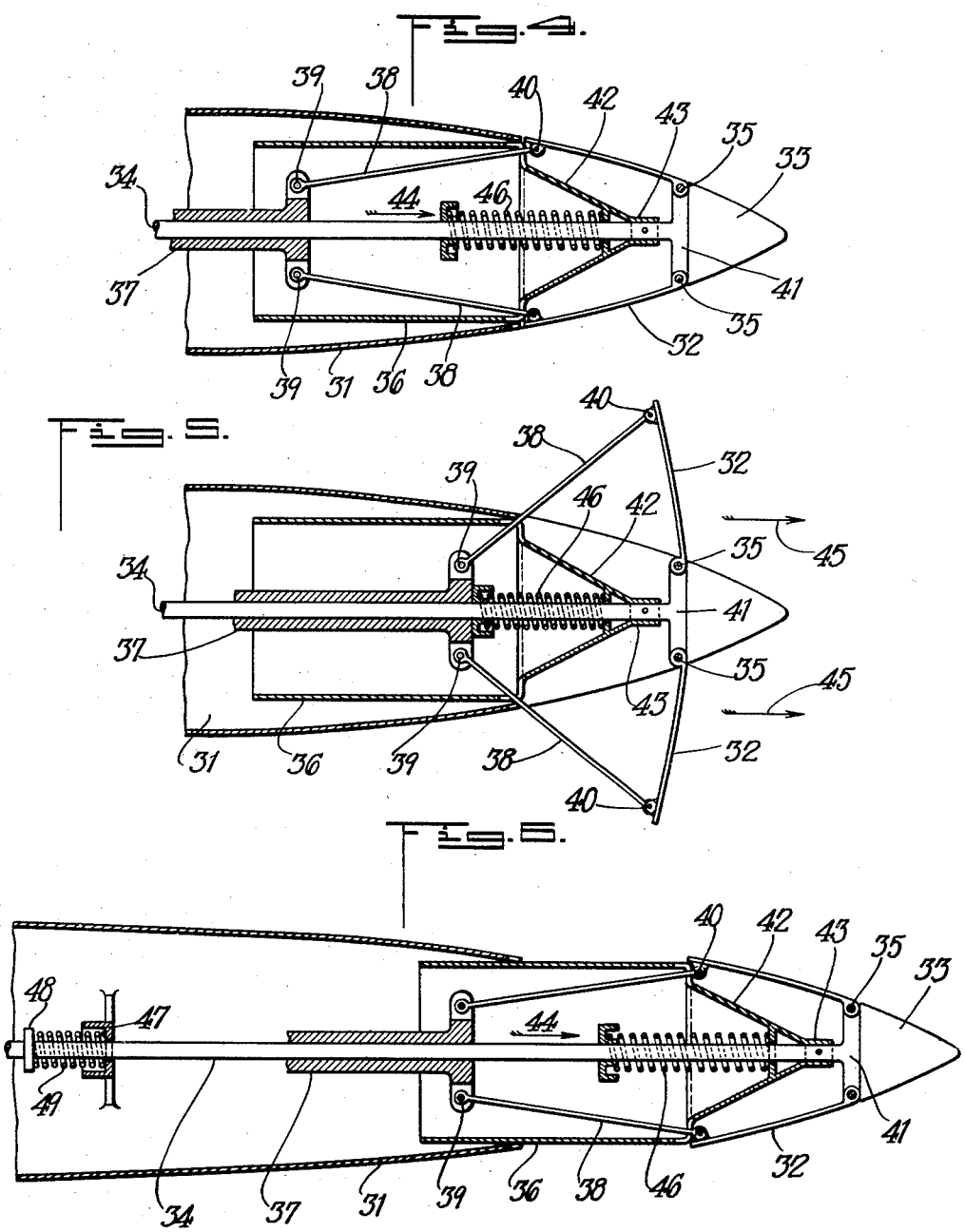

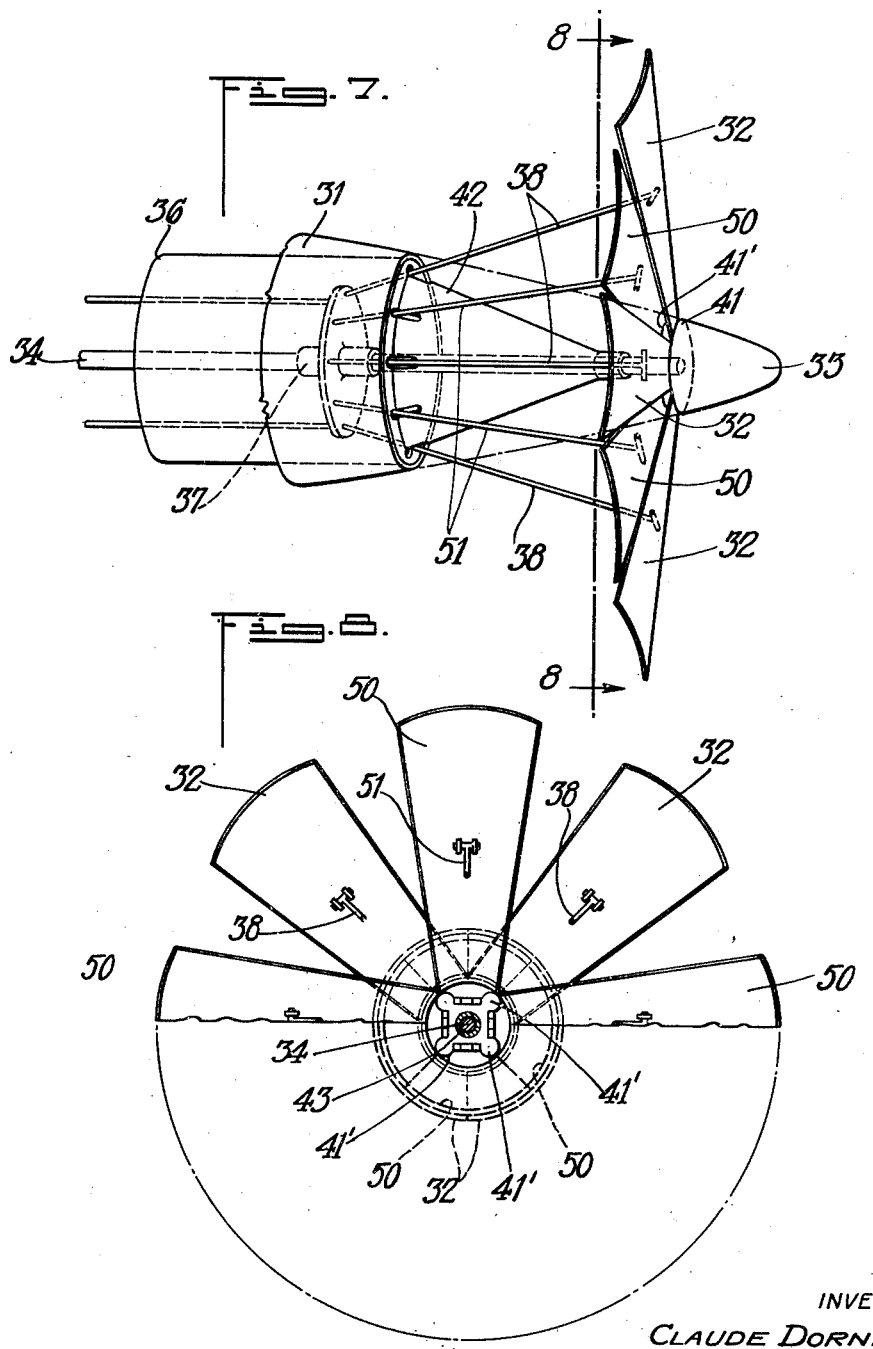

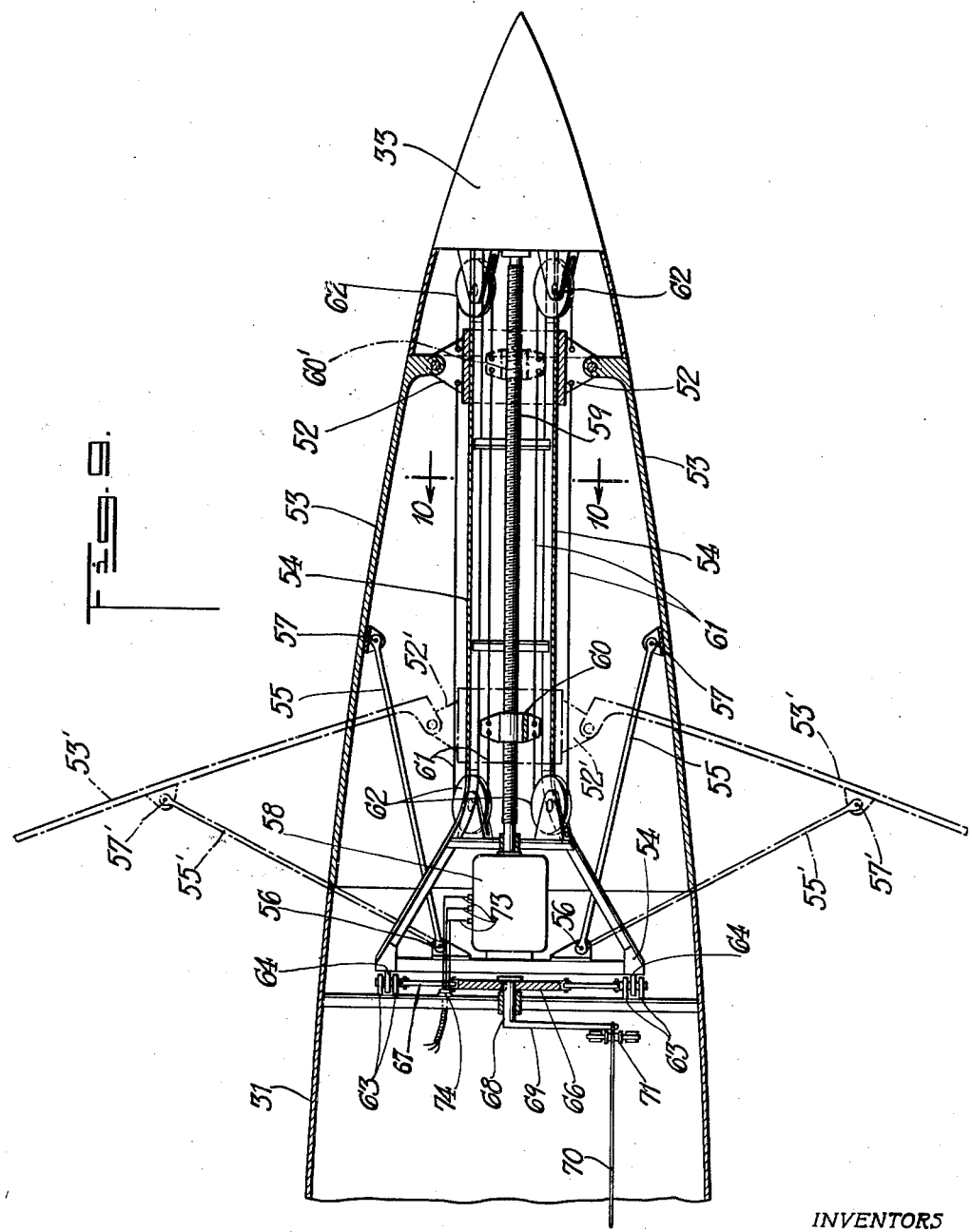

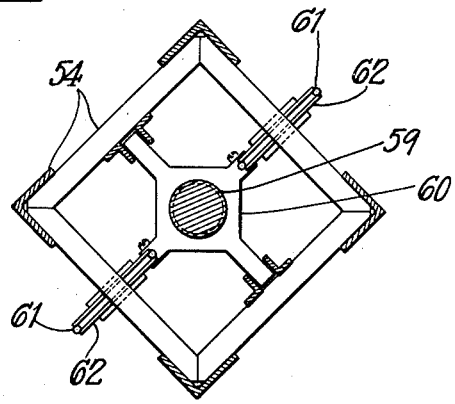
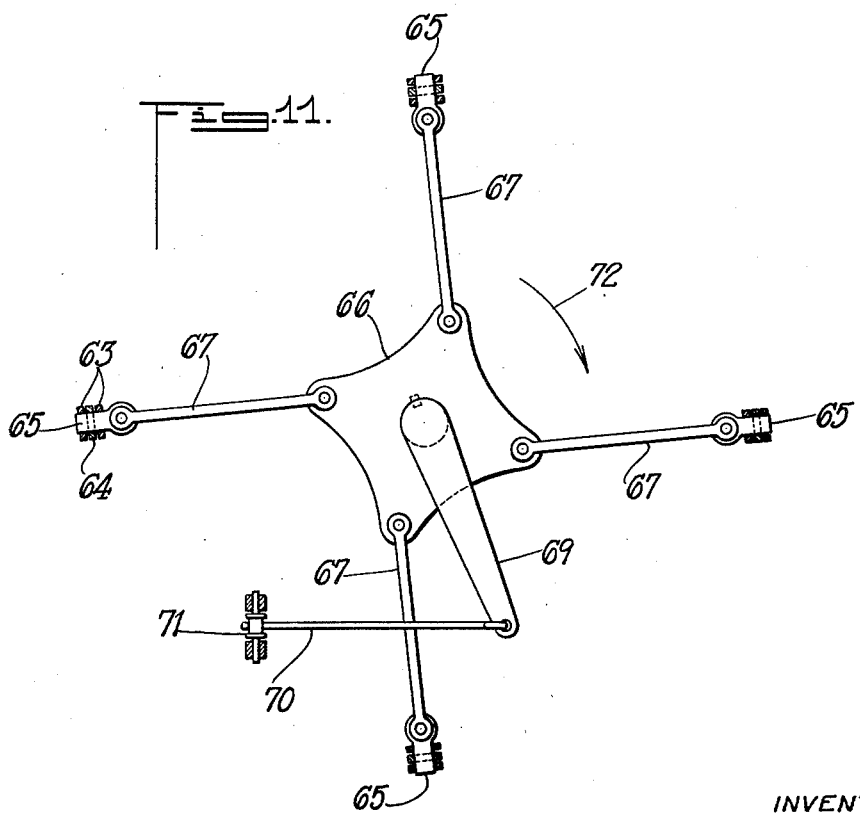

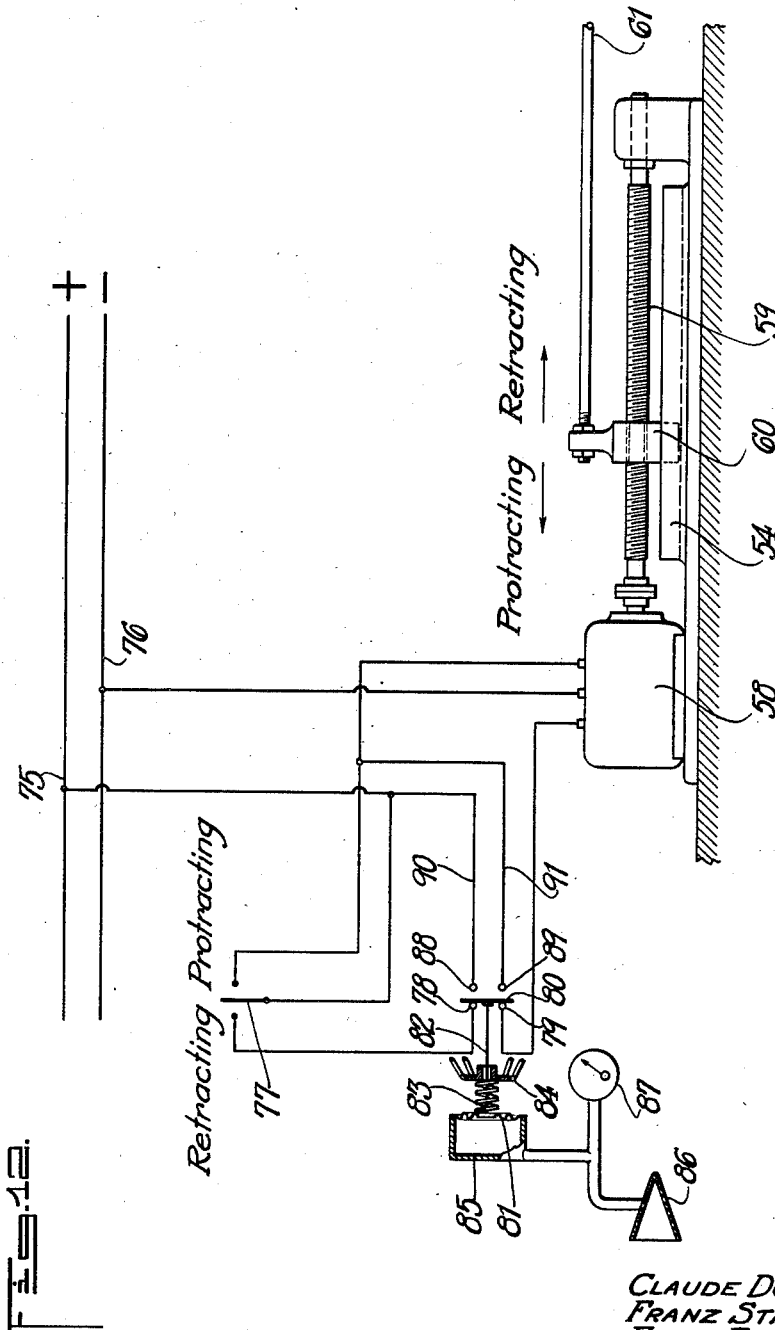

Patented June 10, 1947

2,421,870

UNITED STATES PATENT OFFICE 2,421,870

AIR BRAKE FOR AIRCRAFT

Claude Dornier, Franz Staufer, and Hubert Wähner, Friedrichshafen - on - the - Bodensee, and Franz Bottling, Friedrichshafen-Manzell, Germany; vested in the Attorney General of the United States Application January 23, 1939, Serial No. 252,298
In Germany January 29, 1938

18 Claims. (Cl. 244—113)

The present invention relates to methods and means for artificially increasing the air resistances of aircraft.

Air brakes for reducing and controlling the speed of aircraft in flight and when landing and consisting of adjustable flaps are known. It is also known to provide one or a plurality of parachutes at the tail end of a fuselage which can be unfolded, for example, when the aircraft tends to spin.

An object of the present invention is to provide an air brake for aircraft, particularly for braking and controlling the speed of an aeroplane making a nose dive. A feature of the present invention is the provision of elements of high air resistance on the fuselage and being retractable into the fuselage of the aircraft in the rear of the tail unit. By arranging the air brake in the rear of the tail unit vibrations are prevented which otherwise occur when the brake members or elements are protracted, i. e., in operating position. If the air brake is in front of the tail unit and in operation there is such a disturbance of the air current which causes such violent vibrations of the tail unit and steering apparatus that the safety of the plane is greatly impaired. If the air brake is positioned forward of the elevator the latter and the wings are likely to vibrate. Such an ill-positioned air brake also may cause undesired trimming, a condition which is completely eliminated with the arrangement according to the present invention.

In its simplest form the brake system according to the present invention comprises at least two flaps or other elements of high air resistance which are connected to the rear part of the fuselage in the rear of the tail unit and which are operated by a suitable mechanism so as to be brought from the interior of the aeroplane into the main air current or to be removed therefrom. The brake or resistance elements may be situated in special recesses in the surface of the fuselage or they may cling closely to said surface or they may themselves form a part of the fuselage covering when in rest position. The air resistance elements may be moved into the desired position at will by a suitable actuating mechanism.

With one set only of radially extending flaps large inactive spaces are left between the individual flaps when the brake is in operating position. To eliminate or reduce these inactive spaces we provide one or more additional sets of radially extending flaps whereby the spaces left between the flaps of one set are filled by the flaps of another set of flaps.

Conventional air brakes must be moved against the air current when brought into operating position or removed therefrom and their operation requires much power. With the elements according to the present invention protruding as well as retracting is assisted by the air current. The elements according to the present invention move with the air current and not against it.

The objects of the present invention set forth so far are not sufficient to eliminate disaster. For example, the pilot may not operate the brakes in time when the speed of the plane becomes too fast. He may use the air resistance elements too late, i. e., when the speed of the plane and the air current is already so great that the impact of the air on the brake elements causes a breaking away of said elements. The present invention makes it impossible that the brake is not used at the proper moment. The projection of the brake elements is done automatically, according to the present invention, and the motion of the brake is made dependent upon the damming up of air pressure.

Having now described in a general way some of the objects and principles of the present invention, we proceed in describing some specific embodiments of the present invention. Further and other objects of this invention will be hereinafter set forth in and will be apparent from the following specification and also from the drawings which, by way of illustration show the principle and the operation of certain specific embodiments of our invention.

In the drawings:

Figure 4 is a large scale part sectional schematic view of the rear part of a fuselage with the air brake according to the present invention in rest position.

Figure 5 is a large scale part sectional schematic view of the rear part of a fuselage with the air brake according to the present invention in braking position.

Figure 6 is a large scale part sectional schematic view of the rear part of the fuselage with the air brake according to the present invention in the first stage of the retracting operation.

Figure 7 is an isometric view of a modified air brake proper according to the present invention.

Figure 8 is a cross sectional view of the device illustrated in Fig. 7, said view being taken along line 8—8 in Fig. 7 and in the direction of the arrows in said figure.

Figure 9 is a longitudinal sectional view of a modified air brake operating mechanism according to the present invention.

Figure 10 is a cross sectional view of the brake system shown in Fig. 9 and taken along line 10—10 of that figure.

Figure 11 shows the mechanism for disconnecting and dropping the brake system according to Fig. 9 from the aircraft.

Figure 12 is a wiring diagram for operating an air brake system according to the present invention.

Figure 1:
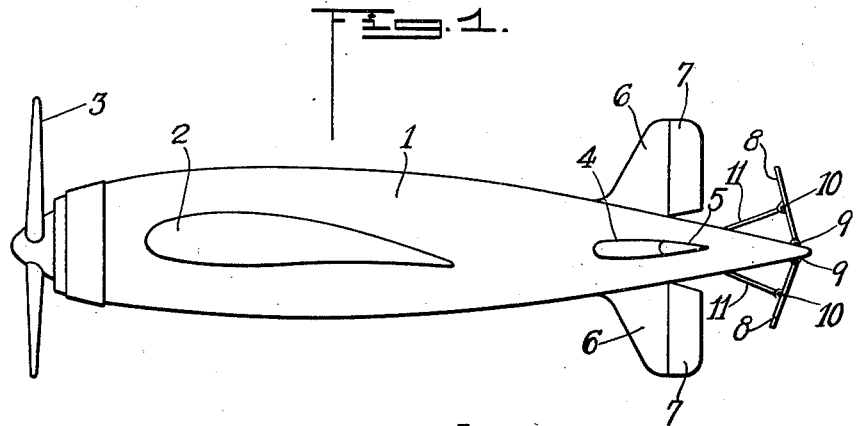
Figure 1 is a schematic side view of an aeroplane equipped with a brake system according to the present invention.

Referring more particularly to Fig. 1 of the drawings, numeral 1 designates the aeroplane fuselage, numeral 2 a wing attached thereto, numeral 3 a propeller, 4 a tail plane, 5 an elevator, 6 are fins with rudders 7 hinged thereto. Two brake flaps 8 which are in symmetric position with respect to one another and to the fuselage are hinged at 9 to the rear end of the fuselage. To each flap an operating rod 10 is movably connected which rod extends into the interior of the fuselage and may be operated therefrom.

Figure 2:
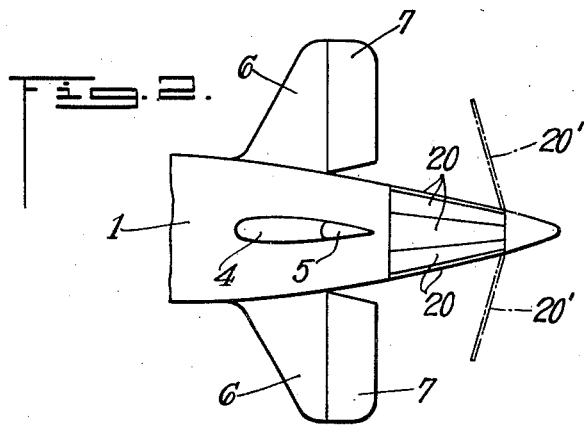
Figure 2 is a large scale side view of the rear part of a fuselage equipped with an air brake according to the present invention.
Figure 3:
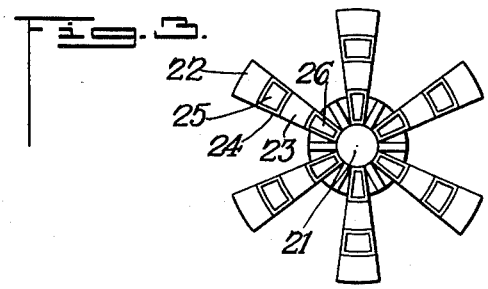
Figure 3 is a rear view of a modified fuselage part similar to that which is shown in Fig. 2.

Figures 2 and 3 illustrate in somewhat larger scale the rear end of a fuselage which is provided with a plurality of flaps 20 which are equally distributed around the rear end and, when in operating position as shown in dotted lines 20′, umbrella like surround said rear end. In Fig. 3, six flaps are provided the frames 24 of which are only partly covered so that air passages 25 and 26 alternate with surfaces 22 and 23 of high air resistance.

Figures 4 to 6 are more detailed illustrations of the operating mechanism for the brake flaps. Particular attention is called to the features which cause relief of the operating mechanism and reduction of power required for its actuation.

The flaps 32 are hinged to a transverse member 41 to which also the rear part 33 of the fuselage 31 is connected. The extreme rear end 33 of the fuselage is carried by an axially displaceable rod 34. The transverse member 41 which carries the hinges 35 for the flaps 32 is rigidly connected with the rod 34. Rod 34 further carries the closing or retracting body 36 in the shape of a cylinder which, for the purpose of connecting it with rod 34, is provided at one end with a cone shaped part 42 the point part 43 of which is fastened to the rod 34. A sleeve member 37 slides on rod 34 and moveably carries one end of the connecting rods 38 by means of hinges 39. The other ends of the connecting rods 38 are hinged at hinges 40 to the air brake flaps 32. Hinges 40 are situated as close as possible to the extreme outer ends of the flaps 32.

Figure 4 shows the device with the flaps in rest position. In this position flaps 32 form the skin of the fuselage between parts 31 and 33. If sleeve 37 is moved in the direction of arrow 44, flaps 32 turn about pivots 35 until they reach the position shown in Fig. 5. The flaps or leaves 32 move in the direction of the air current which is indicated by the arrows 45; therefore very little power is needed for projecting the flaps into operating position. The movement of sleeve 37 may be controlled during the entire length of its stroke or the movement may be just started and carried on until the ends of the flaps are slightly removed from the fuselage so that the relative wind can blow underneath the flaps and cause their full opening or swinging out. A buffer consisting, for example, of a spring 46 is provided for preventing a too violent final opening of the umbrella like air brake.

For closing the air brake and returning it into rest position sleeve 37 is retained at first, in the position it assumes in full open position of the brake and rod 34 is moved rearwards in the direction of arrow 44 until the device is in the position illustrated in Figure 6. This rearward movement of rod 34 requires practically no power because the rod with the brake in open condition is pulled by the relative wind. To prevent a movement too far rearward of rod 34 and parts attached thereto a stop member 47 is provided adjacent to rod 34 and fixed to the fuselage and a collar 48 on rod 34 and a spring 49 disposed adjacent to member 47 and adapted to engage collar 48 when the latter and rod 34 reach outermost position. Upon rearward movement of rod 34 closing body 36 also moves rearward and forms a continuation of fuselage 31 and closes the opening between the fuselage and the air brake. If then, sleeve 37 is moved forward simultaneously with rod 34 the air brake is returned into rest position, i. e., the whole device is returned into the position shown in Fig. 4. Very little power is needed for this operating step because the cylinder 36 prevents undesirable air currents. With this method of closing the umbrella like air brake the leaves are moved in the direction of the relative wind and closing requires very little power, if any.

The brake flaps 8, 20 and 32 according to Figs. 1 to 6 leave considerable wedge-shaped inactive space when the brake is in open or operating position.

With a design of the brake as per Figs. 7 and 8 additional flaps 50 are provided which are disposed concentric with and fill the otherwise inactive spaces between the flaps 32. Flaps 50 form the inner shell and flaps 32 form the outer shell of the brake and, when closed, of the fuselage between the fuselage parts 31 and 33. Two adjacent transverse members 41 and 41′ are provided whereby flaps 32 are hinged to member 41 and flaps 50 to member 41′. In Figure 8 the brake is shown in closed position by means of dotted lines.

In the device illustrated in Figs. 7 and 8, the connecting rods 38 of flaps 32 and the rods 51 of flaps 50 are not hinged to the extreme ends of the flaps but to an intermediary part of the flaps. This reduces the load on the hinges of the flaps.

Figs. 9 to 11 illustrate an embodiment of our invention in which the transverse member 52 to which the flaps 53 are hinged is not rigidly connected with a rod and the rear part 33 of the fuselage but is slidable on a suitable guide member 54. The latter is rigidly connected with the fuselage and the rear part 33 thereof. Guide member 54 is preferably built up of a plurality of angle irons and has great resistance against bending and torsion. The free ends of the connecting rods 55 are not connected to a movable part but are hinged at 56 to the fuselage or the guide frame 54. When transverse member 52 is moved forward on guide member 54 the flaps 53 are spread open. By this arrangement the number of moving parts is greatly reduced and the safety and stability of the device is increased. The construction according to Fig. 9 is also of less weight. By locating the hinges 57 of connecting rods 55 and flaps 53 substantially at the center of the flaps or rather at a point at which the air pressure acting on the flaps is balanced, the power required to operate the flaps is much reduced. In case of too strong vibrations of the brake end of the fuselage caused by eddy air currents in the rear of the nose dive brake and/or because the brake may be damaged provisions are made to disconnect and drop the whole brake and brake operating mechanism from the aircraft.

The position of the brake in action is shown in dash and dotted lines in Fig. 9. The flap carrier 52 is then in position 52' and the flaps in position 53'.

Movement of the flap carrier 52 is caused by a motor 58 which drives a threaded spindle 59 which is rotatably supported in the frame 54. A nut 60 runs on spindle 59 and is connected by means of chains, cables or the like 61 which run over rollers 62 with the flap carrier 52. If, because of rotation of spindle 59 by means of motor 58, nut member 60 which cannot rotate is moved against the direction of flight into the position 60' the flap carrier 52 is moved in the direction of flight into position 52' whereby the flaps 53 are spread outward or open.

Figure 10 is a cross sectional view of the framework 54 for supporting and guiding the flap carrier 52. This view particularly shows the position of spindle 59 and of ropes 61 and pulleys 62 with respect to the frame.

Figure 11 is a large scale view of the mechanism for dropping the whole air brake mechanism. Rigidly connected with the fuselage 31 are four pairs of eyes or projections 63. Between each pair fits another eye or projection 64 which is rigidly connected with the guide frame 54. Each set of projections 63, 64 is provided with an opening into which a bolt 65 is inserted which interconnects the projections and thereby the guide frame 54 and the fuselage 31. The bolts 65 are individually movably connected with the control or actuating disc 66 by means of the connecting rods 67. Disc 66 is revolvably mounted on the fuselage 31 by means of an axle 68 which carries a crank lever 69. To the free end of lever 69 a flexible member 70 such as a wire, rope, cable, chain or the like is connected and guided by means of roller 71. Upon pulling the flexible means 70 disc 66 rotates in the direction of the arrow 72 whereby the bolts 65 are removed from the eyes 63, 64. The whole brake mechanism is then free to separate itself from the aircraft and drop to the ground. The wires 73 of the electric motor 58 are plugged into a suitable plug 74 connected with the fuselage 31 and are pulled out of the plug when the air brake is dropped.

Figure 12 diagrammatically illustrates the wiring system for the motor 58 for moving the air brake into braking and into rest position. The motor receives its power from the live wires 75 and 76. By operating switch 77 the operator can make motor 58 run in the desired direction. Operation of the motor for retracting the air brake depends always on the operation of the switch 77 by the operator. Protracting the brake elements into operating, i. e., braking position is done automatically in dependence on the stemming pressure of the air; it also can be done manually. One power line between switch 77 and motor 58 is interrupted at the points 78 and 79 which are normally bridged over by the switch member 80. The latter is connected to and operated by the diaphragm 81 by means of a connecting element 82. It is held in closing position by means of the spring 83 which tends to move diaphragm 81 to the left and rests against an abutment 84 which is rigidly connected with the aircraft. Spring 83 is not needed if diaphragm 81 itself is of sufficient resiliency to counteract the air pressure in chamber 85. Diaphragm 81 closes one side of the box 85 the interior of which is connected with the nozzle 86 which receives the relative wind and together with the pressure gauge 87 measures the stemming pressure of the air. If the latter pressure exceeds a desired and predetermined value diaphragm 81 is bent to the right and pushes, by means of the connecting rod 82, bridge member 80 over to interconnect the points 88 and 89 whereby a power circuit is closed which makes motor 58 rotate in such direction as to move the nut member 60 to the left whereby the brake elements 53 are protracted. In Fig. 12 which is a diagrammatic showing only, members 60, 61 and 54 are of somewhat different configuration than in the other figures; this is to show that the system illustrated in Fig. 12 is applicable to a great variety of brake mechanisms.

Contacts 88 and 89 together with conduits 90 and 91, if electrically interconnected by bridge 80, short-circuit the power line for operating the motor 58 in protracting direction which can be manually controlled by the switch 77. Protracting is therefore automatically caused independently of the position of switch 77. On the other hand, switch 77 can be effectively manipulated for protracting the air brake flaps independently of the position of switch member 80. As soon as the nose dive is finished and/or the relative wind pressure is reduced to a desired low value diaphragm 81 returns to the normal position in which bridge 80 interconnects contacts 78 and 79 so that the pilot may retract the brake elements into rest position by moving switch 77 to the left.

While we believe the above described embodiments of our invention to be preferred embodiments, we wish it to be understood that we do not desire to be limited to the exact details of method, design and construction shown and described for obvious modifications will occur to a person skilled in the art.

We claim:

1. An air brake system for aircraft having a fuselage, an extreme fuselage rear end portion protractably and retractably connected with said fuselage, said system comprising brake elements protractably and retractably connected with said rear end portion, and a joint brake-element-and rear-end-protracting and retracting-mechanism affording simultaneous protraction of said rear end and retraction of said brake elements.

2. An airbrake system for aircraft having a fuselage, said system comprising an umbrella like air resisting device connected with said fuselage and being adapted to be opened for substantial radial extension from said fuselage and to be closed for closely adhering to said fuselage, an operating mechanism for opening and closing said air brake, and a relative wind pressure dependent control means connected with said operating mechanism said control means being adapted to cause opening of said air resisting device upon excessive pressure of the relative wind.

3. An air brake system for aircraft having a fuselage, said system comprising an umbrella like air resisting device connected with said fuselage and being adapted to be opened for substantial radial extension from said fuselage and to be closed for closely adhering to said fuselage, an operating mechanism for opening and closing said air brake, an electric motor capable to rotate in two directions for driving said operating mechanism for opening or closing said air brake, a wiring system connected with said motor and including a switch for operating said motor in one or the other direction, a relative wind pressure operated switch in said wiring system and operating said motor in the direction for opening said air brake upon excessive wind pressure independently from the position of said first mentioned switch.

4. An air brake system for aircraft having a fuselage, said system comprising an air brake having air resisting elements movably connected with said fuselage and being adapted to be protruded from said fuselage for causing air resistance and to be retracted to said fuselage for substantially eliminating air resistance, an operating mechanism for protruding and retracting said air brake, and a relative wind pressure dependent control means connected with said operating mechanism and causing protruding of said air resisting device upon excessive pressure of the relative wind.

5. An airbrake system for aircraft having a tail unit and a fuselage having a rear part of substantially cone shaped configuration and extending rearwardly beyond said tail unit, a brake carrier means protractably and retractably connected with said rear part and adapted to reciprocatingly move substantially along the longitudinal axis of said fuselage, said airbrake system including a plurality of brake leaves hingedly connected with said carrier means and being disposed closely adjacent to said rear part and in the rear of said tail unit when in non-braking folded up position and branching out from said carrier means and forming a forward open angle with said rear part when in unfolded braking position, said carrier means being protracted for the purpose of folding said brake leaves.

6. An air brake system as claimed in claim 5 and including operating means longitudinally reciprocatingly movably connected with said brake carrier and rod members individually swingably connected with the inner surface of said brake leaves and with said operating means.

7. An aircraft having a tail unit, a fuselage having a rear portion of substantially conical outside configuration and being disposed in the rear of said tail unit, a collapsible air brake comprising a set of brake leaves, each leaf having a small end hingedly connected with and adjacent to the point end of said conical rear portion, said leaves widening out from said small end and covering said rear portion forward of said small end when said brake is in collapsed condition, said leaves extending substantially radially from said rear portion and leaving substantially triangularly shaped open spaces between said leaves when said brake is in braking position, another set of brake leaves of similar configuration as the leaves of said first mentioned set and being positioned directly adjacent to the leaves of said first mentioned set and filling the open spaces between the leaves of the first mentioned set when in braking position, and being covered by the leaves of the first set and, together with said first set, covering said rear portion in onion skin like manner when in non-braking position.

8. An aircraft having a tail unit, a fuselage having a rear portion of substantially conical outside configuration and being disposed in the rear of said tail unit, a collapsible air brake comprising a set of brake leaves, each leaf being hingedly connected with said conical rear portion and adjacent to the point thereof, said leaves covering said rear portion forward of said small end when said brake is in collapsed condition, said leaves extending substantially radially from said rear portion and leaving substantially triangularly shaped open spaces between said leaves when said brake is in braking position, another set of brake leaves of similar configuration as the leaves of said first mentioned set and being positioned directly adjacent to the leaves of said first mentioned set and filling the open spaces between the leaves of the first mentioned set when in braking position, and being substantially covered by the leaves of the first set and, together with said first set, covering said rear portion in onion skin like manner when in non-braking position.

9. An aircraft having a tail unit, a fuselage comprising an extreme rear portion extending rearward beyond said tail unit and longitudinally movably connected with said fuselage, an air brake system comprising brake vanes laterally swingably connected with said rear portion, a rear portion moving mechanism for moving said rear portion from and to said fuselage, means for laterally swinging said brake vanes away from said rear portion and for holding said vanes and moving said vanes towards said rear portion upon movement thereof from said fuselage in the direction of the wind.

10. An air brake system for aircraft having a tail unit and a fuselage comprising a stationary part and a protractable and retractable rear end portion disposed in the rear of said tail unit, an operating member connected with said rear end portion for changing the position thereof with respect to the stationary part of said fuselage, a plurality of brake elements swingably connected with said rear end portion, and brake element operating means slideably connected with said operating member and swingably connected with said brake elements.

11. An air brake system as claimed in claim 5 and including operating means longitudinally reciprocatingly movably connected with said brake carrier and rod members individually swingably connected with the outer edge of said brake leaves and with said operating means.

12. An air brake system as claimed in claim 8 in which said closing body includes a cylindrical portion fitting into the rear end of said fuselage and reciprocatingly movably connected therewith.

13. In an air brake system for aircraft having a fuselage and a tail unit connected thereto, a central brake carrier member positioned in the rear of said tail unit and longitudinally movably connected with said fuselage, a plurality of individual brake elements individually directly hingedly connected to said carrier member and extending substantially radially therefrom when in operating position, anchor means connected with said fuselage and adapted to be stationary with respect to said carrier member, and stay members individually movably connecting said brake elements and said anchor means.

14. An air brake system as claimed in claim 13 in which said brake elements are leaf like and comprise portions of great air resistance and portions of little air resistance.

15. An air brake system as claimed in claim 13 in which said brake elements are leaf like and comprise frame means and skin means covering portions of said frame means and leaving other portions of said frame means uncovered and providing for air passage through said frame means.

16. An air brake system as claimed in claim 13 in which said brake elements are leaf like and comprise air passage means affording air passage through portions of said elements.

17. An airbrake system for aircraft having a fuselage comprising a main fuselage portion and a tail unit mounted thereon and an independent, tapered fuselage rear portion extending rearwardly beyond said tail unit and being protractably and retractably connected with said main fuselage portion, said airbrake system comprising a plurality of rigid brake leaves hingedly connected with said rear portion and branching out from said rear portion and partly overlapping one another when in braking position and being brought into non-braking position, and overlapping one another and forming the surface of said rear portion in the rear of said tail unit upon protraction of said fuselage rear portion.

18. An airbrake system for aircraft having a fuselage comprising a main fuselage portion and a tail unit mounted thereon, an air brake carrier protractably and retractably connected with the rear end of said fuselage in the rear of said tail unit, a plurality of rigid brake leaves hingedly and overlappingly connected with said carrier and branching out therefrom when in braking position and being brought into non-braking position upon protraction of said carrier.

CLAUDE DORNIER.
FRANZ STAUFER.
FRANZ BOTTLING.
HUBERT WÄHNER.

REFERENCES CITED

The following references are of record in the file of this patent:

UNITED STATES PATENTS

| Number | Name | Date |
|---|---|---|
| 1,274,986 | Carolin | Aug. 6, 1918 |
| 1,780,410 | Tupta | Nov. 4, 1930 |
| 2,095,020 | Adams | Oct. 5, 1937 |
| 1,297,604 | Smith | Mar. 18, 1919 |
| 1,772,388 | Doehler | Aug. 5, 1930 |
| 1,834,149 | Goddard | Dec. 1, 1931 |
| 1,858,112 | Roberts | Dec. 1, 1931 |
| 2,101,443 | Meinert | Dec. 7, 1937 |
| 1,351,905 | Harvey | Sept. 7, 1920 |
| 2,139,163 | Jones | Dec. 6, 1938 |
| 1,019,647 | Horton | Mar. 5, 1912 |
| 1,125,365 | Mayer | Jan. 19, 1915 |
| 1,433,395 | Marshall | Oct. 24, 1922 |
| 1,972,967 | Zahodiakin | Sept. 11, 1934 |
| 2,254,591 | Dornier | Sept. 2, 1941 |

FOREIGN PATENTS

| Number | Country | Date |
|---|---|---|
| 815,858 | France | Apr. 19, 1937 |
| 593,572 | France | May 30, 1925 |
| 829,680 | France | Apr. 19, 1938 |
| 374,737 | France | Apr. 25, 1907 |
| 261,721 | Italy | Dec. 13, 1928 |